Oct. 30, 1962 L. BENTZMAN 3,060,825
LENS BOARD MOUNTING ARRANGEMENTS
Filed Oct. 16, 1959 5 Sheets-Sheet 5
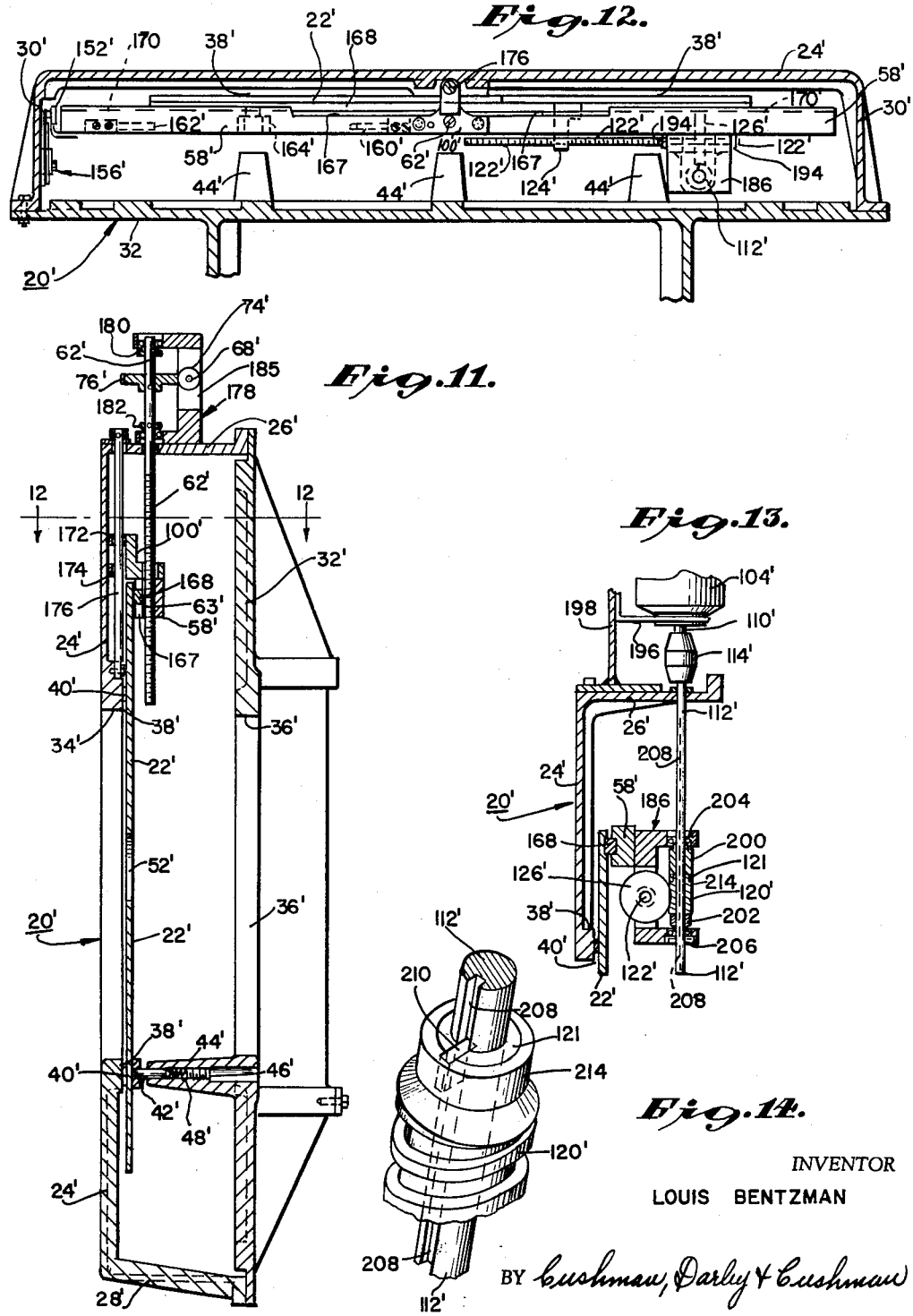
INVENTOR
LOUIS BENTZMAN
BY Cushman, Darby & Cushman
ATTORNEYS United States Patent Office 3,060,825
Patented Oct. 30, 1962

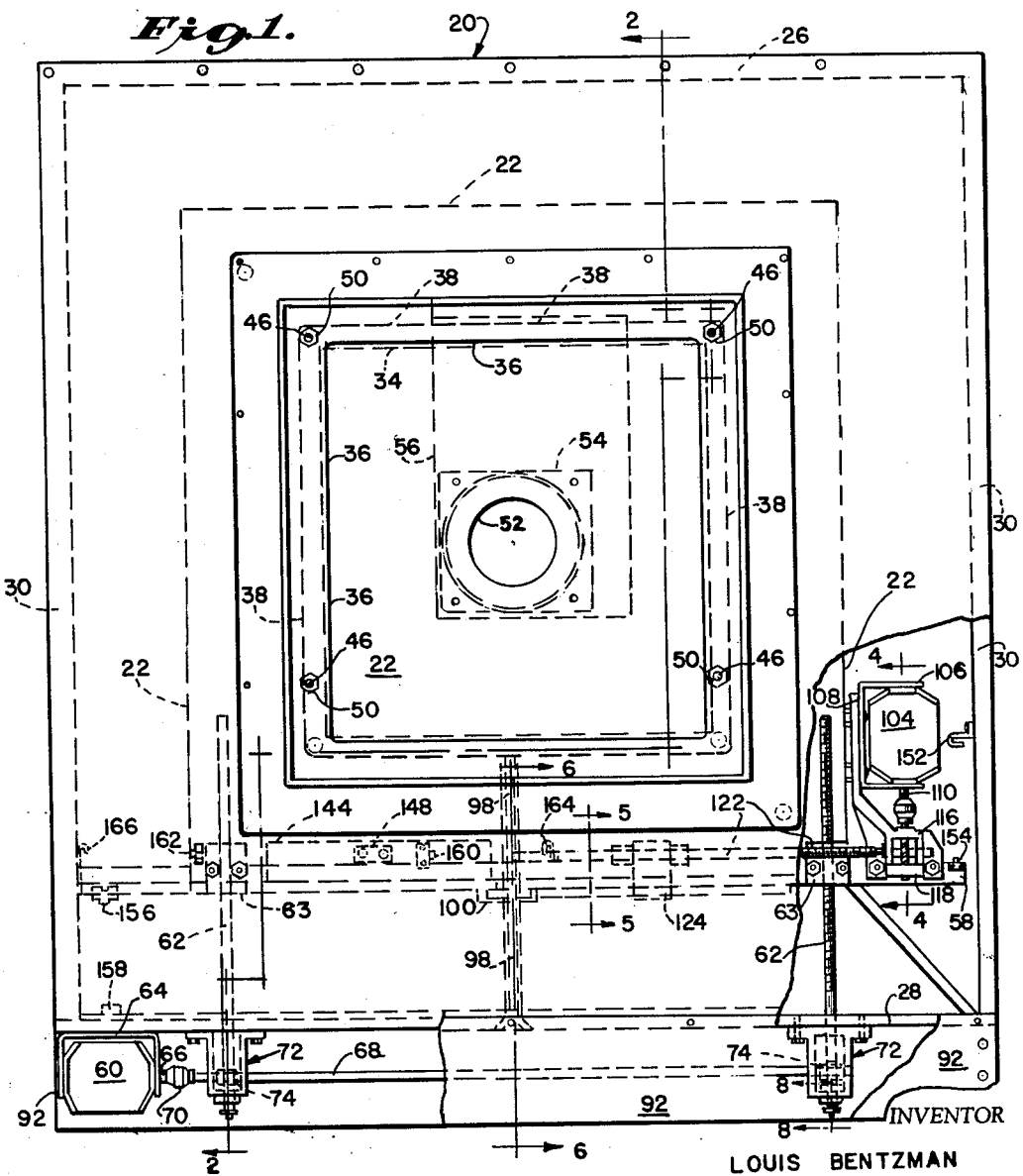

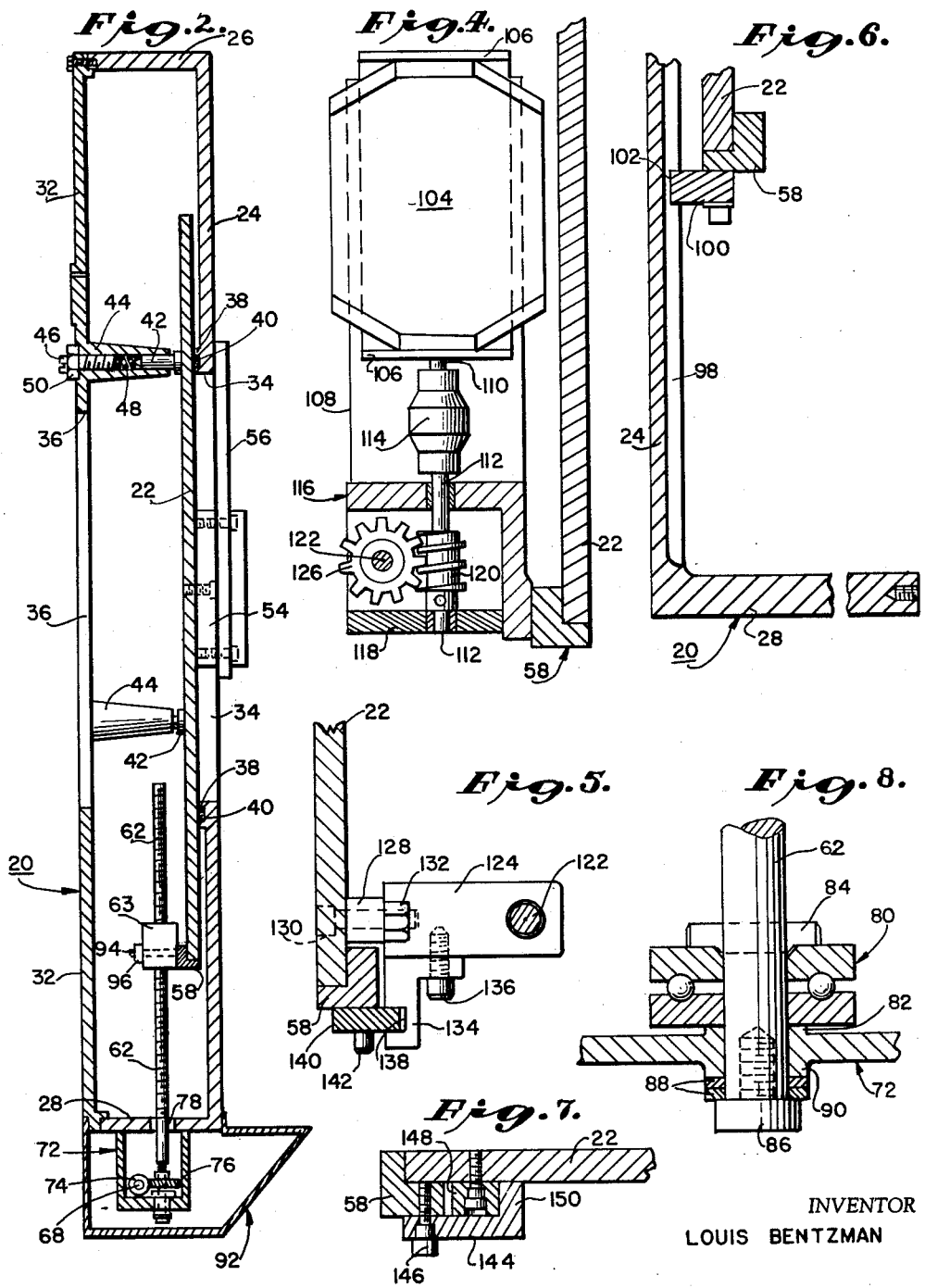

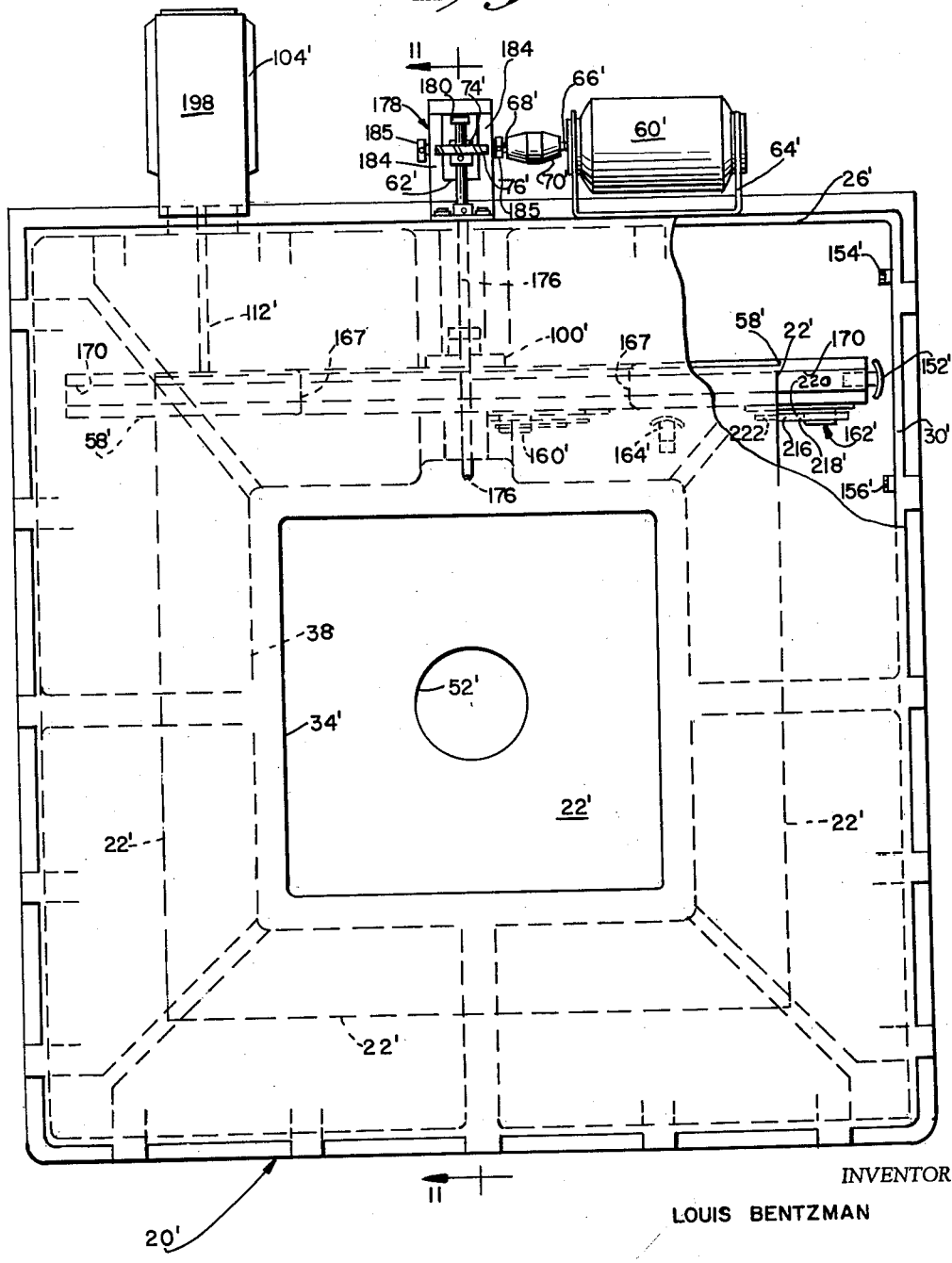

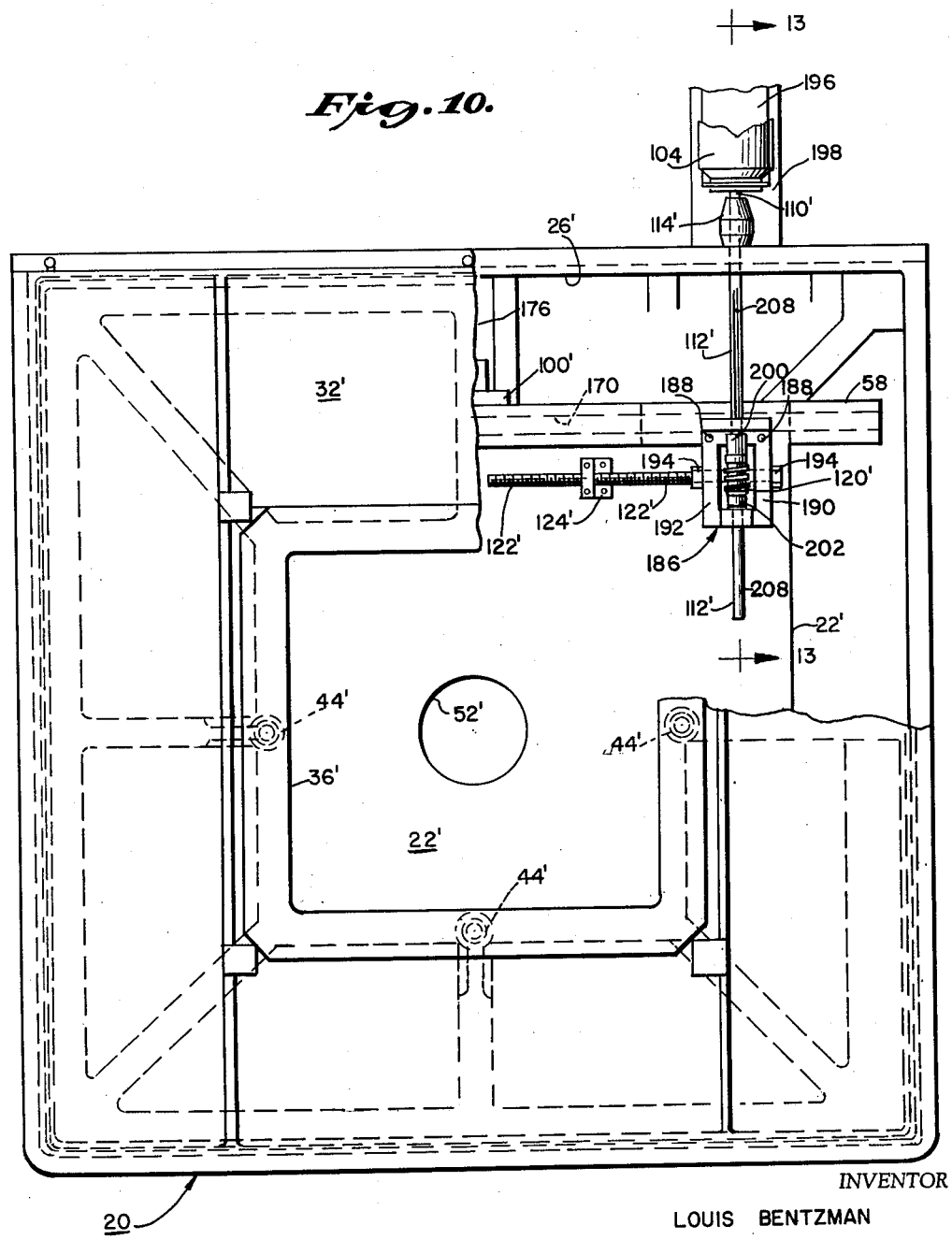

3,060,825
LENS BOARD MOUNTING ARRANGEMENTS
Louis Bentzman, Broomall, Pa., assignor to Lanston Industries, Incorporated, Philadelphia, Pa., a corporation of Virginia
Filed Oct. 16, 1959, Ser. No. 846,984
3 Claims. (Cl. 95—51)

This invention relates to lens board mounting arrangements of the type particularly adapted to be utilized in precision, utility, or process cameras wherein accurate positioning of the lens is required for proper operation.

An important object of the present invention is to provide a novel lens board mounting arrangement wherein the lens board is designed as a single planar member, and wherein novel means are provided for moving the lens board in both horizontal and vertical directions. A related and more specific object is to provide a novel combination of means for mounting the lens board, means for adjusting the position of the lens board, and means for confining the lens board to substantially rectilinear or straight line movements in substantially a single plane.

In the preferred embodiments of the invention, as will be described in more detail hereinbelow, the means for mounting the lens board includes a guide rail or the like supported by the means for moving the lens board in one direction, and also engaged to and supporting the lens board so that the latter is movable with the guide rail in said one direction. The engagement between the lens board and the guide rail is such as to enable the lens board to be moved relative to the guide rail and in directions perpendicular to said one direction. The lens board and guide rail are arranged within a housing having a wall provided with an opening therein registering with the opening in the lens board, and means are carried by the housing for continuously urging the lens board toward said wall and in such manner as to retain the lens board substantially in a single plane during the adjusting movements thereof.

Thus, the present invention contemplates a movable lens board mounting arrangement comprising: a housing having an opening therein; a lens board; a guide rail engaged to said lens board along one side of said board; said guide rail and said lens board being arranged in said housing; means for moving said guide rail and said lens board together in directions perpendicular to the long axis of said guide rail; means for moving said lens board relative to said guide rail and in directions parallel to the long axis of said guide rail; and means for confining said lens board to substantially rectilinear or straight line movements in substantially a single plane. It is further contemplated that the housing include means defining an abutment surrounding the opening therein, with the means for confining the movements of said lens board comprising guiding members and also spring-urged members, the latter being mounted by said housing and arranged to yieldingly press said lens board against said abutment. The guiding members are also an important feature of the invention, and they are designed to insure that the lens board can only move in substantially vertical or horizontal directions, thus preventing misalignment of the lens board during such movements.

In one of the illustrative embodiments of the invention to be described in more detail hereinbelow, the means for moving the guide rail and lens board together, in directions perpendicular to the long axis of the guide rail, is arranged in stationary position relative to the housing, while the means for moving the lens board relative to the guide rail is carried by the guide rail and is movable therewith.

In another embodiment of the invention, to be set forth in more detail hereinbelow, the means for moving the lens board in both directions includes motors arranged in stationary position relative to the housing.

Other objects of the invention reside in the novel structures, arrangements, and combinations thereof providing a simplified and durable movable lens board arrangement, capable of superior and highly accurate performance.

Further objects and advantages of the invention will be in part obvious and in part pointed out hereinafter.

The novel features of the invention may be best made clear from the following description and accompanying drawings in which:

FIGURE 1 is a rear elevational view of a movable lens board mounting arrangement, partly broken away, and illustrating one embodiment of the invention;

FIGURE 2 is a vertical, sectional view taken generally along line 2—2 in FIGURE 1;

FIGURE 3 is a top plan view of the lens board, guide rail and certain related structure shown in FIGURE 1, and with the housing omitted;

FIGURE 4 is an enlarged and fragmentary vertical, sectional view taken generally along line 4—4 of FIGURE 1, and with the housing omitted;

FIGURE 5 is an enlarged and fragmentary vertical, sectional view taken generally along line 5—5 of FIGURE 1, and with the housing omitted;

FIGURE 6 is an enlarged and fragmentary vertical, sectional view taken generally along line 6—6 of FIGURE 1, and with some structure omitted;

FIGURE 7 is an enlarged and fragmentary sectional view taken generally along line 7—7 of FIGURE 3;

FIGURE 8 is an enlarged and fragmentary vertical, sectional view taken generally along line 8—8 of FIGURE 1;

FIGURE 9 is a front elevational view of a movable lens board mounting arrangement, partly broken away, and illustrating another embodiment of the invention;

FIGURE 10 is a rear elevational view of the device shown in FIGURE 9, partly broken away and with certain structures omitted for clarity and convenience of illustration;

FIGURE 11 is a vertical, sectional view through line 11—11 of FIGURE 9, and with some structure omitted for convenience and clarity of illustration;

FIGURE 12 is a horizontal, sectional view taken along line 12—12 of FIGURE 11;

FIGURE 13 is a fragmentary and enlarged vertical, sectional view taken generally along line 13—13 of FIGURE 9; and FIGURE 14 is an enlarged and fragmentary perspective view showing an exemplary construction for drivingly connecting a worm to the vertical drive shaft in FIGURE 13.

Referring now to the embodiment of the invention illustrated in FIGURES 1-8, it will be seen that there is provided a housing 20 having a lens board 22 mounted therein. The housing 20 is shown as being of generally rectangular or square shape including integral front 24, top 26, bottom 28 and side 30 walls and a detachable rear wall 32. The rear wall 32 may be engaged to the housing in any suitable manner, as by screws, extending through the top of this wall and into the top, side and bottom walls, as best seen in FIGURES 1 and 2.

The front 24 and rear 32 walls of the housing are shown as being formed, respectively, with generally square or rectangular openings 34, 36 therein. Extending rearwardly from the front wall 24 is an abutment 38 circumscribing or surrounding the opening 34. As will be more fully explained hereinbelow, the present invention contemplates novel structural arrangements for pressing the lens board 22 against this abutment 38, and for retaining the lens board substantially in a single plane, while providing for adjusting movements of the lens board in straight lines in both horizontal and vertical directions. This abutment 38 is shown in FIGURE 2 as being formed with a coextensive recess therein, and a suitable anti-friction, sealing material, such as mohair or felt indicated by numeral 40 may be disposed in this recess for engagement to the lens board. Other materials, such as nylon or Teflon, may also be used, if desired.

The means for urging the lens board 22 against the pad 40 is shown as including a plurality of plungers 42 mounted in centrally bored lugs 44 extending forwardly from the housing rear wall 32 as best seen in FIGURES 1 and 2. A plug screw 46 is screwed into the rear end of these lugs 44, and a compression spring 48 is arranged between this screw 46 and the plunger 42, wherefor the plunger is continuously urged toward the front wall 24. Nut 50 is shown as locking the screw 46 in position.

In this embodiment, four of these lugs 44 and plungers 42 are arranged in the manner just described, the plungers pressing against the lens board 22, and facing opposite to or in horizontal alignment with portions of the abutment 38. This abutment 38 is indicated in FIGURE 1 as being of generally rectangular or square configuration, with two of the lugs 44 and plungers 42 being arranged at the top corners of the abutment 38, while the other two of these lugs 44 and plungers 42 are shown as being arranged adjacent to and somewhat above the bottom corners of the abutment, as best seen in FIGURE 1.

The lens board 22 is shown as being of generally rectangular or square configuration, including a centrally arranged aperture 52. As is understood, suitable lens structure will be arranged in this aperture 52. A lens board adaptor 54 and image reverter 56 are shown attached to the lens board 22. As will be appreciated, the opening 52 in the lens board will remain within the confines of the opening 34 in the housing front wall 24, during adjusting movements of the lens board.

The housing 20 may be secured to a camera base (not shown) by any suitable means, or it may be secured to a carriage on a camera base adapted to move back and forth on the base, in the usual manner.

In the embodiment under consideration, the lens board 22 is shown as being engaged to and supported by the horizontal leg of a horizontally disposed and L-shaped guide rail 58, as indicated in FIGURES 1, 2, 5 and 7. This guide rail is of greater length than the width of the lens board, and projects from either side thereof laterally toward the housing side walls 30, as indicated in FIGURE 1. The guide rail 58 is supported in position by the means for moving the guide rail and lens board together vertically, while the lens board is also movable horizontally, and relative to the guide rail, by means carried by the guide rail, as will now be explained in more detail.

The means for supporting the guide rail and moving it in vertical directions is shown as including a prime mover or motor 60 arranged below the housing bottom wall 28, and drivingly connected to vertically disposed lead or lifting screws 62, which are in turn threadedly engaged to driving nuts 63 suitably attached to the guide rail 58 in fixed position, so as not to rotate. The motor 60 is shown as being mounted by an inverted U-shaped bracket 64 carried by the housing bottom wall 28, and the output shaft 66 of the motor is drivingly connected to a horizontally extending drive shaft 68 by means of any appropriate coupling 70. In this embodiment, this coupling preferably is a conventional flexible coupling.

Cup-like brackets 72 are shown as being engaged to the housing bottom wall 28, extending downwardly therefrom, for receiving and mounting the shaft 68 and the lead or lifting screws 62. These brackets 72 are provided with horizontally aligned apertures, having suitable bearings therein, for receiving, supporting and journalling the drive shaft 68, as indicated. A worm 74 is drivingly connected to and carried by the shaft 68 within each of the brackets 72, this worm meshing with a worm gear or worm wheel 76 drivingly connected to and carried by the plain or unthreaded bottom portion of the lead screws 62, as best seen in FIGURE 2.

The lead screws 62 are suitably journalled in bearings 78 provided in the housing bottom wall 28, and suitable means are also provided at the bottom of the brackets 72 for supporting these screws 62 in stationary vertical position, while permitting rotation thereof. An exemplary construction of this latter means is shown in FIGURE 8, and includes a thrust bearing 80 mounted on each lead screw 62 and supported by an annular boss 82 on the bottom wall of the bracket 72. A thrust pin 84 is mounted in the lead screws 62, extending diametrically therethrough, and resting against the bearing 80, as indicated. A screw 86 is shown as being engaged to the bottom of the lead screws 62, with washers 88 being provided between the head of this screw 86 and an annular boss 90 depending from the bottom wall of the brackets 72, thus preventing upward vertical movement of the lead screws, as will be evident.

A cover 92 is shown as enclosing the motor 60, shaft 68 and brackets 72 at the bottom of the housing 20. This cover may be of any appropriate form, suitably secured to the housing, as by screws, as indicated.

Thus it will be seen that energization of the motor 60 to rotate shaft 68 will result in vertical movement of the guide rail 58 and lens board 22, by reason of the provision of the lead screws 62 in threaded connection with the nuts 63. These nuts are shown as being engaged to the vertical leg of the guide rail by means of screws 94 and nuts 96, the heads of the screws 94 being disposed in recesses in the guide rail 58, as indicated in FIGURE 3, and being formed with sockets therein for engagement by an appropriate tool.

The invention also contemplates provision of means for guiding the lens board and rail 58 during their vertical movements, and for preventing misalignment during such movements. This means is shown as including a vertical keyway 98 formed on the inside of the housing front wall 24 and extending from the bottom side of the abutment 38 down to the bottom wall 28, at approximately the horizontal midpoint of the wall 24, as best seen in FIGURES 1 and 6. A key 100 is suitably attached to the horizontal leg of the guide rail 58, as shown, and includes a projecting portion 102 adapted to ride in the keyway 98, as indicated in FIGURES 3 and 6.

This key 100 and keyway 98, in addition to maintaining proper alignment of the lens board and rail 58 during the vertical movements thereof, add stability to the structure.

Referring now to the means for effecting horizontal movements of the lens board 22, and relative to the guide rail 58, this means in the embodiment under consideration includes a prime mover or motor 104 mounted in stationary position on the right hand end of the guide rail 58, as viewed in FIGURE 1. This motor is shown as being mounted on a C-shaped holder 106 carried by a bracket 108 secured to the vertical leg of the guide rail 58, as in the manner indicated in FIGURES 1 and 4. The output shaft 110 of the motor 104 is connected to a vertical drive shaft 112, as by a suitable coupling 114, which, as in the case of coupling 70, may also be a conventional flexible coupling. The bracket 108 is shown as including an inverted U-shaped portion 116, constituting a gear housing, and closed at its lower end by a plate or bottom wall 118, fastened thereto in any appropriate manner. The drive shaft 112 extends through and is suitably journalled in the top and bottom walls of this gear housing, and a worm 120 is drivingly connected to and carried by the shaft 112 within the gear housing, as best seen in FIGURE 4.

A horizontal lead or driving screw 122 is drivingly connected to the shaft 112, and threadedly engaged in a driving nut 124 suitably attached to the lens board so as not to rotate. As best seen in FIGURES 3 and 5, the nut 124 includes a laterally extending flange 128 at its forward end, and screws 130 and nuts 132 are utilized for securing this flange to the lens board 22, the heads of these screws being arranged in recesses in the lens board, as indicated. One end of the lead screw 122 is plain and unthreaded, extending through and being journalled in the vertical side walls of the gear housing 116, with a worm gear or worm wheel 126 being drivingly connected to and carried by the lead screw 122 in the gear housing, and in driving engagement with the worm 120.

Thus, energization of the motor 104 will effect rotation of the lead screw 122 whereby the lens board 22 will be moved in horizontal directions on and relative to the guide rail 58.

Means are provided for guiding horizontal movements of the lens board to assure that they are rectilinear, with the vertical position of the lens board remaining unchanged during such movements. In the embodiment shown, this means includes a guide element 134 attached to the underside of the nut 124, as by screw 136, and formed with a notch 138 arranged in sliding engagement with a retainer or rail 140 engaged to the underside of the rail 58, as by screws 142, as best seen in FIGURE 5. This retainer 140 is shown as extending from a point approximately at the middle of the rail 58 to the right, as viewed in FIGURES 1 and 3, to a point adjacent the nut 63 at the right hand end of the rail 58. Another guide element 144 is engaged to the left side of the guide rail 58, as by screws 146, as indicated in FIGURES 1, 3 and 7. This element 144 is of angulated cross sectional configuration, as shown in FIGURE 7. A retainer 148 of relatively short length is secured to the lens board 22 and is disposed within the guide 144, in sliding engagement with the horizontal leg 150 thereof, as shown in FIGURE 7.

Suitable means will be provided for controlling operation of the motors 60, 104. These motors may be of any conventional form, and the wiring connected to the motor 104 will have sufficient slack therein so as not to interfere with vertical movements of this motor with the guide rail 58. The electrical circuitry and switches for operating these motors may be of any standard design, and therefore have not been shown in the drawing. As will be appreciated, the switches may be disposed in any desired location, for example, for remote control of the movements of the lens board.

Suitable stops may be provided for limiting the adjusting movements of the lens board in either horizontal or vertical directions. For example, as shown in FIGURE 1, a trip 152 may be provided on the right hand side wall 30 of the housing to actuate a conventional switch 154 disposed on the guide rail 58 directly therebeneath, when the guide rail is raised to the highest vertical position thereof desired. The switch 154 will be suitably connected in the electrical circuit to de-energize the motor 60 when this switch is actuated by reason of contact with the trip 152. A corresponding switch 156 is provided on the bottom of the guide rail 58 at the left hand end thereof, as seen in FIGURE 1, for actuation by a limit trip 158 fixed to the housing bottom wall 28 directly therebeneath, when the guide rail is moved to its lowest vertical position. Switch 156 will likewise operate to de-energize the motor 60 when this switch is actuated by the trip 158.

Switches 160, 162 and trips 164, 166 are provided for limiting the horizontal movements of the lens board. These structures may be similar to the switches and trips for limiting vertical movement and the trips 164, 166 are shown as being mounted on the guide rail 58, while the switches 160, 162 are mounted on the lens board for movement therewith so that these switches will be actuated when the lens board is moved to its extreme horizontal positions in the housing 20. These switches are suitably connected into the circuitry for motor 104, so that when actuated they will operate to de-energize the motor.

Another embodiment of the invention is shown in FIGURES 9–13, and structures in this embodiment similar to corresponding structures in the previously described embodiment will be designated by similar reference numerals. In this embodiment, the lens board 22' is again of generally rectangular or square configuration arranged in a generally rectangular or square housing 20', the latter having generally rectangular or square openings 34', 36' in the front 24' and rear 32' walls thereof, with an abutment 38' extending rearwardly from and surrounding the front opening 34'. A stripping or seal 40' of appropriate material, such as Teflon, is interposed between the lens board 22' and the abutment 38', being coextensive with and attached to the abutment.

Plungers 42' are mounted in lugs 44' on the rear wall 32', and are urged by springs 48' into firm engagement with the lens board. A set screw 46' is tightened into the threaded part of the bore in the lug 44', for effecting the desired spring pressure on the plunger 42', as will be evident. The button at the outer, free end of the plunger may be made of any suitable material, such as nylon. Three of these plunger 42' and lug 44' assemblies are shown as being provided in this embodiment, extending forwardly from the housing rear wall 32', and facing opposite the abutment 38', as indicated. However, it will be understood that, as in the case of the previously described embodiment, the number, arrangement and positioning of these plunger 42 or 42' and lug 44 or 44' assemblies may be varied, as desired.

A key 168 is secured to the lens board, adjacent the top and at the rear thereof, this key being slidably disposed in a longitudinal groove 170 in the guide rail 58'. The key 168 may extend from one end of the lens board to the other, while the guide rail is shown as projecting laterally from either end of the lens board, and including a centrally disposed, longitudinally extending recess 167, as best seen in FIGURES 11 and 12. A guide member 100' is secured to the top of the guide rail 58, approximately at the midpoint of the latter, and includes vertically-spaced apertured projections 172, 174 through which extends a stationary vertical guide shaft 176, suitably mounted in the housing in the position shown, as in the manner indicated. The guide member 100' may be secured to the rail 58 as by screws, and a vertical hole is provided in this member in vertical alignment with a threaded hole 63' through the rail 58'.

The lens board 22' and guide rail 58' are supported in vertical position by the means for effecting vertical movements thereof, as was the case in the previously described embodiment. In this embodiment, however, the means for effecting these movements of the lens board and guide rail are arranged above the guide rail. As shown, the lifting or lead screw 62' is threadedly engaged in the hole 63' in the guide rail, extending upwardly through a bearing in the housing top wall 26', and through the top and bottom walls of a mounting bracket 178. It might be noted that the hole in member 100', through which screw 62' extends, will be sufficiently larger in diameter than screw 62' so as not to interfere with rotation thereof.

Suitable means will be provided in the top and bottom walls of the bracket 178, and on the unthreaded portions of the lead screw adjacent thereto to prevent vertical movements of the lead screw while permitting rotation thereof. Suitable bearing members, such as those indicated by reference numerals 180, 182, may be utilized for this purpose.

The lead screw 62' is drivingly connected to prime mover 60', the latter being shown mounted in U-shaped bracket 64' attached to the housing top wall 26'. The output shaft 66' is connected through a suitable coupling 70', such as a flexible coupling, to a drive shaft 68' journalled in the sides 184 of the bracket 178. Collars 185 are shown on shaft 68', externally of bracket sides 184. A worm 74' is carried by this shaft 68', between the bracket sides 184 and in engagement with a worm gear or worm wheel 76' affixed to the lead screw 62', as indicated.

Thus, energization of the motor 60' will effect rotation of the lead screw 62', whereby the guide rail 58', guide member 100' and lens board 22' will be moved in vertical directions. The guide shaft 176 and guide 100' will operate to maintain straight-line vertical movements and proper alignment of the lens board, while is position is being changed.

The means for effecting horizontal movements of the lens board 22' includes a horizontal lead or driving screw 122' threadedly engaged to a nut 124' fixedly attached to the rear of the lens board 22', screw 122' also being drivingly connected to motor 104' shown as being mounted in stationary position above the housing top wall 26'. The motor 104' is mounted by a bracket 196, carried by a support 198 attached to the housing top wall 26', as indicated, and the output shaft 110' of the motor is drivingly connected to a vertical drive shaft 112', as by the flexible coupling 114'.

It is contemplated that the drive shaft 112' be drivingly connected to the lead screw 122' to transmit rotation rotation thereto, while permitting vertical movement of the lead screw 122' with the lens board 22' and relative to the shaft. In the illustrative embodiment under consideration, the structure provided for this purpose includes a gear bracket 186 secured to the rear of the guide rail 58', as by screws 188, and arranged in a position directly below the motor 104'. The unthreaded portion of lead screw 122' is journalled in the opposite sides 190, 192 of this bracket, and suitable means, such as collars 194, are provided on screw 122', as shown in FIGURE 10, for preventing any horizontal movements of this screw. As best seen in FIGURE 13, the vertical drive shaft 112' extends through and is journalled in the housing top wall 26' and also in the top and bottom walls of the gear bracket 186. A worm 120' is mounted on the drive shaft 112' between spacers 200, 202, and in engagement with a worm gear 126' affixed to the lead screw 122' within the gear bracket 186, as shown. These spacers 200, 202 are engaged to bearings 204, 206, respectively, these bearings being mounted in the top and bottom walls of the gear bracket 186, as shown. The spacers 200, 202 are of cylindrical shape and the bore therethrough is slightly larger than the diameter of the drive shaft 112'.

The drive shaft 112' is formed with a longitudinal keyway 208 therein, extending from the bottom thereof up to about housing top wall 26', as best seen in FIGURES 10 and 13. And, as best seen in FIGURE 14, a small key 210 is arranged in this keyway and in suitable engagement with an annular projection 121 on the worm 120' whereby the worm and key may be moved vertically relative to the shaft 112' without disturbing the driving connection between the shaft and the worm. The key 210 may be arranged in a slot 212 in projection 121, and a collar 214 is shown as surrounding this end of the worm to retain the key in position. It will be appreciated that the diameter of the bore in the worm 120' will be slightly larger than the diameter of the shaft 112'.

Thus, it will be apparent that energization of the motor 104' will result in rotation of the lead screw 122' to effect horizontal movements of the lens board 22' and relative to the rail 58'.

High 154' and low 156' switches are shown in FIGURES 9 and 12 as being arranged on a side wall 30' of the housing for actuation by a trip 152' carried by the rail 58', and when this rail and the lens board reach the extreme upper and lower limits of their desired range of movement. These switches will be electrically connected to the motor 60' in any desirable manner to deenergize this motor when they are actuated by the trip 152' at either limit position.

Switches 160', 162' are shown carried by the guide rail 58', at the bottom thereof, for actuation by a trip 164' carried by the lens board, as indicated in FIGURE 9. These switches are likewise suitably electrically connected to de-energize the motor 104' when actuated by the trip 164' at the extreme limits of the desired range for horizontal movement of the lens board.

These switches 154', 156', 160', 162' and the motors 60', 104' may be of any standard design. For example, as best seen in FIGURE 9, the switches may all be similar to switch 162' including normally closed contacts 216 carried by a stationary arm 218 and a movable arm 220, the latter arm including an enlargement 222 at its free end arranged to be actuated by trip 164' to open contacts 216.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:
1. A movable lens board mounting arrangement comprising:
    (1) a housing having an opening therein and means defining an abutment surrounding said opening;
    (2) a lens board;
    (3) a guide rail engaged to said lens board along one edge of said board, said guide rail and said lens board being arranged within said housing;
    (4) biasing means continuously urging said lens board adjacent said abutment for confining said lens board in substantially a single plane;
    (5) motor means carried by said guide rail for moving said lens board relative to said guide rail in a direction parallel to the long axis thereof;
    (6) and motor means mounted to said housing for moving said lens board and guide rail together in a direction perpendicular to the long axis of said guide rail.
2. The structure defined in claim 1 wherein said guide rail is engaged to said lens board along the upper side of the latter whereby said lens board is suspended from said guide rail.
3. The structure defined in claim 1 wherein said guide rail is engaged to said lens board along the lower side of said board whereby said lens board is supported on said guide rail.

References Cited in the file of this patent
UNITED STATES PATENTS

| | | |
|---|---|---|
| 1,535,225 | Hays | Apr. 28, 1925 |
| 2,492,898 | Siekermann | Dec. 27, 1949 |
| 2,844,082 | Blatherwick | July 22, 1958 |